US012801839B2

(12) United States Patent

Himeno et al.

(10) Patent No.: US 12,801,839 B2

(45) Date of Patent: Nov. 17, 2026

(54) INFORMATION PROCESSING SYSTEM, NON-TRANSITORY COMPUTER READABLE MEDIUM STORING PROGRAM, AND INFORMATION PROCESSING METHOD FOR CHANGING TWO-DIMENSIONAL TABLE TO REDUCE SCROLLING

(71) Applicant: FUJIFILM Business Innovation Corp., Tokyo (JP)

(72) Inventors: Takumi Himeno, Kanagawa (JP); Hiroaki Amemiya, Kanagawa (JP)

(73) Assignee: FUJIFIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/460,575

(22) Filed: Sep. 3, 2023

(65) Prior Publication Data

US 2024/0303420 A1 Sep. 12, 2024

(30) Foreign Application Priority Data

Mar. 10, 2023 (JP) ................................ 2023-037101

(51) Int. Cl.
*G06F 40/177* (2020.01)
*G06F 40/106* (2020.01)

(52) U.S. Cl.
CPC .......... *G06F 40/177* (2020.01); *G06F 40/106* (2020.01)

(58) Field of Classification Search
CPC ..................................................... G06F 40/177
See application file for complete search history.

(56) References Cited

U.S. PATENT DOCUMENTS

| | | | | |
|---|---|---|---|---|
| 10,831,983 | B2 * | 11/2020 | Bathla | G06F 40/106 |
| 2010/0070491 | A1 * | 3/2010 | Cragun | G06F 16/00 707/722 |
| 2016/0224613 | A1 | 8/2016 | Miller et al. | |
| 2021/0073242 | A1 * | 3/2021 | Webster | G06F 16/26 |

FOREIGN PATENT DOCUMENTS

| | | |
|---|---|---|
| JP | 2010205189 | 9/2010 |
| JP | 2020144674 | 9/2020 |

OTHER PUBLICATIONS

"Search Report of Europe Counterpart Application", issued on Jan. 23, 2024, pp. 1-9.

* cited by examiner

*Primary Examiner* — Asher D Kells
(74) *Attorney, Agent, or Firm* — JCIPRNET

(57) ABSTRACT

An information processing system includes a processor configured to: set an arrangement of headers in a two-dimensional table, in which an attribute value of a first attribute given to a file is a header of each row and an attribute value of a second attribute given to the file is a header of each column, with reference to history information in which a user and a cell selected by the user are recorded in association with each other in a case in which the user selects the cell of the two-dimensional table; and display the two-dimensional table in which the arrangement of the headers has been set.

13 Claims, 9 Drawing Sheets

| | X COMPANY | Y COMPANY | Z COMPANY |
|---|---|---|---|
| P1 | 1 | 3 | 2 |
| P2 | 1 | 1 | 1 |
| P3 | 5 | 2 | 2 |

FIG. 4

SCORE CALCULATION TABLE (FOR USER A)

| | X COMPANY | Y COMPANY | Z COMPANY | TOTAL |
|---|---|---|---|---|
| P1 | 0 | 1 | 0 | 1 |
| P2 | 0 | 0 | 1 | 1 |
| P3 | 0 | 0 | 1 | 1 |
| TOTAL | 0 | 1 | 2 | 3 |

| RANK |
|---|
| 1 |
| 1 |
| 1 |

| | | | |
|---|---|---|---|
| RANK | 3 | 2 | 1 |

FIG. 5

TWO-DIMENSIONAL TABLE (FOR USER A)

| | Z COMPANY | Y COMPANY | X COMPANY |
|---|---|---|---|
| P2 | 1 | 1 | 1 |
| P3 | 2 | 2 | 5 |
| P1 | 2 | 3 | 1 |

FIG. 6

44

TWO-DIMENSIONAL TABLE (PROJECT NUMBER × BUSINESS PARTNER) ⊠

MY SORT (INDIVIDUAL) ▼

| | Z COMPANY | Y COMPANY | X COMPANY |
|---|---|---|---|
| P2 | 1 | 1 | 1 |
| P3 | 2 | 2 | 5 |
| P1 | 2 | 3 | 1 |

THRESHOLD VALUE SETTING

42

FIG. 7

SCORE CALCULATION TABLE (FOR USER B)

| | X COMPANY | Y COMPANY | Z COMPANY | TOTAL |
|---|---|---|---|---|
| P1 | 1 | 0 | 0 | 1 |
| P2 | 1 | 0 | 0 | 1 |
| P3 | 1 | 0 | 0 | 1 |
| TOTAL | 3 | 0 | 0 | 3 |

| RANK |
|---|
| 1 |
| 1 |
| 1 |

| | | | |
|---|---|---|---|
| RANK | 1 | 2 | 2 |

FIG. 8

TWO-DIMENSIONAL TABLE (FOR USER B)

| | X COMPANY | Y COMPANY | Z COMPANY |
|---|---|---|---|
| P1 | 1 | 3 | 2 |
| P2 | 1 | 1 | 1 |
| P3 | 5 | 2 | 2 |

FIG. 9

SCORE CALCULATION TABLE (FOR USER C)

| | X COMPANY | Y COMPANY | Z COMPANY | TOTAL |
|---|---|---|---|---|
| P1 | 0 | 1 | 1 | 2 |
| P2 | 0 | 0 | 0 | 0 |
| P3 | 1 | 1 | 1 | 3 |
| TOTAL | 1 | 2 | 2 | 5 |

| RANK |
|---|
| 2 |
| 3 |
| 1 |

| | | | |
|---|---|---|---|
| RANK | 3 | 1 | 1 |

TWO-DIMENSIONAL TABLE (FOR USER C)

| | Y COMPANY | Z COMPANY | X COMPANY |
|---|---|---|---|
| P3 | 2 | 2 | 5 |
| P1 | 3 | 2 | 1 |
| P2 | 1 | 1 | 1 |

(a)

TWO-DIMENSIONAL TABLE (FOR USER A)

| | Z COMPANY | Y COMPANY | X COMPANY |
|---|---|---|---|
| P2 | 1 | 1 | 1 |
| P3 | 2 | 2 | 5 |
| P1 | 2 | 3 | 1 |

THRESHOLD VALUE = 0.25

(b)

TWO-DIMENSIONAL TABLE (FOR USER A)

| | Z COMPANY | Y COMPANY |
|---|---|---|
| P2 | 1 | 1 |
| P3 | 2 | 2 |
| P1 | 2 | 3 |

FIG. 14

(a) SCORE CALCULATION TABLE (FOR USER A)

| | X COMPANY | Y COMPANY | Z COMPANY | TOTAL | RANK |
|---|---|---|---|---|---|
| P1 | 0 | 1 | 0 | 1 | 1 |
| P2 | 0 | 0 | 1 | 1 | 1 |
| P3 | 0 | 0 | 1 | 1 | 1 |
| TOTAL | 0 | 1 | 2 | 3 | |
| RANK | 3 | 2 | 1 | | |

(b) SCORE CALCULATION TABLE (FOR USER B)

| | X COMPANY | Y COMPANY | Z COMPANY | TOTAL |
|---|---|---|---|---|
| P1 | 1 | 0 | 0 | 1 |
| P2 | 1 | 0 | 0 | 1 |
| P3 | 1 | 0 | 0 | 1 |
| TOTAL | 3 | 0 | 0 | 3 |

(c) SCORE CALCULATION TABLE (FOR USER C)

| | X COMPANY | Y COMPANY | Z COMPANY | TOTAL |
|---|---|---|---|---|
| P1 | 0 | 1 | 1 | 2 |
| P2 | 0 | 0 | 0 | 0 |
| P3 | 1 | 1 | 1 | 3 |
| TOTAL | 1 | 2 | 2 | 5 |

(d) TOTAL TABLE

| | X COMPANY | Y COMPANY | Z COMPANY |
|---|---|---|---|
| P1 | 1 | 2 | 1 |
| P2 | 1 | 0 | 1 |
| P3 | 2 | 1 | 2 |

SCORE OF USER A CORRESPONDING TO CELL HAVING MAXIMUM VALUE × 1.5

(e) SCORE CALCULATION TABLE (FOR USER A)

| | X COMPANY | Y COMPANY | Z COMPANY | TOTAL | RANK |
|---|---|---|---|---|---|
| P1 | 0 | 1.5 | 0 | 1.5 | 1 |
| P2 | 0 | 0 | 1.0 | 1 | 3 |
| P3 | 0 | 0 | 1.5 | 1.5 | 1 |
| TOTAL | 3 | 1.5 | 2.5 | 4 | |
| RANK | 3 | 2 | 1 | | |

FIG. 15

(a) SCORE CALCULATION TABLE (FOR USER A)

| | X COMPANY | Y COMPANY | Z COMPANY | TOTAL | RANK |
|---|---|---|---|---|---|
| P1 | 0 | 1 | 0 | 1 | 1 |
| P2 | 0 | 0 | 1 | 1 | 1 |
| P3 | 0 | 0 | 1 | 1 | 1 |
| TOTAL | 0 | 1 | 2 | 3 | |
| RANK | 3 | 2 | 1 | | |

SCORE OF USER A × 2

SCORE OF USER OTHER THAN USER A × 1

(b) SCORE CALCULATION TABLE (FOR USER B)

| | X COMPANY | Y COMPANY | Z COMPANY | TOTAL |
|---|---|---|---|---|
| P1 | 1 | 0 | 0 | 1 |
| P2 | 1 | 0 | 0 | 1 |
| P3 | 1 | 0 | 0 | 1 |
| TOTAL | 3 | 0 | 0 | 3 |

(d) SCORE CALCULATION TABLE (FOR USER A)

| | X COMPANY | Y COMPANY | Z COMPANY | TOTAL | RANK |
|---|---|---|---|---|---|
| P1 | 1 | 3 | 1 | 5 | 2 |
| P2 | 1 | 0 | 2 | 3 | 3 |
| P3 | 2 | 1 | 3 | 6 | 1 |
| TOTAL | 4 | 4 | 6 | 14 | |
| RANK | 2 | 2 | 1 | | |

(c) SCORE CALCULATION TABLE (FOR USER C)

| | X COMPANY | Y COMPANY | Z COMPANY | TOTAL |
|---|---|---|---|---|
| P1 | 0 | 1 | 1 | 2 |
| P2 | 0 | 0 | 0 | 0 |
| P3 | 1 | 1 | 1 | 3 |
| TOTAL | 1 | 2 | 2 | 5 |

SCORE OF USER OTHER THAN USER A × 1

INFORMATION PROCESSING SYSTEM, NON-TRANSITORY COMPUTER READABLE MEDIUM STORING PROGRAM, AND INFORMATION PROCESSING METHOD FOR CHANGING TWO-DIMENSIONAL TABLE TO REDUCE SCROLLING

CROSS-REFERENCE TO RELATED APPLICATIONS

This application is based on and claims priority under 35 USC 119 from Japanese Patent Application No. 2023-037101 filed Mar. 10, 2023.

BACKGROUND

(i) Technical Field

The present invention relates to an information processing system, a non-transitory computer readable medium storing a program, and an information processing method.

(ii) Related Art

For example, in a case in which data is a document, each document is given a plurality of attributes such as a creation date, a creator, a document type, and the number of pages. The use of a two-dimensional table makes it possible to two-dimensionally summarize a large number of documents stored in a database from two viewpoints, that is, from two attributes. For example, in a case in which the documents are aggregated for each creator and each document type, an aggregate value of files corresponding to each of attribute values of the creator and the document type, which are headers of a row and a column, is displayed in a cell included in the two-dimensional table. Therefore, it is possible to two-dimensionally understand the number of documents. For example, it is possible to two-dimensionally understand who (creator) created the document for what purpose (document type) and who created what type of document.

Meanwhile, the user is allowed to select two attributes designated for the row and the column of the two-dimensional table, which makes it possible for the user to generate a two-dimensional table in which the attribute values of each attribute are the headers of the row and the column. However, in a case in which the same attribute is selected as the headers of the rows and the columns, the arrangement of the headers of the rows and the columns is the same regardless of who creates the two-dimensional table. That is, the arrangement of the attribute values of each attribute is uniform regardless of who selects two attributes. Therefore, the two-dimensional table is uniformly generated.

SUMMARY

Since the number of attribute values of the attributes that are the headers of the row or the column is large, the entire two-dimensional table may not be displayed on a display screen.

However, in a case in which the attribute values of the attributes that are the headers of the rows or the columns are uniformly arranged to generate the two-dimensional table, for example, the user needs to scroll information related to the attribute value, which is to be referred to, to display the information on the screen. As a result, the user may find it difficult to use the two-dimensional table.

Aspects of non-limiting embodiments of the present disclosure relate to an information processing system, a non-transitory computer readable medium storing a program, and an information processing method that display an arrangement of headers in a two-dimensional table that is easy for the user to use with reference to a cell selection history of a user, as compared to a case in which the arrangement is uniformly displayed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a processor configured to: set an arrangement of headers in a two-dimensional table, in which an attribute value of a first attribute given to a file is a header of each row and an attribute value of a second attribute given to the file is a header of each column, with reference to history information in which a user and a cell selected by the user are recorded in association with each other in a case in which the user selects the cell of the two-dimensional table; and display the two-dimensional table in which the arrangement of the headers has been set.

BRIEF DESCRIPTION OF THE DRAWINGS

Exemplary embodiment(s) of the present invention will be described in detail based on the following figures, wherein:

FIG. 4 is a diagram showing an example of the setting of a score calculation table for a user A in Exemplary Embodiment 1;

FIG. 5 is a diagram showing a two-dimensional table for the user A in Exemplary Embodiment 1;

FIG. 6 is a diagram showing an example of the display of a two-dimensional table display screen in Exemplary Embodiment 1;

FIG. 7 is a diagram showing an example of the setting of a score calculation table for a user B in Exemplary Embodiment 1;

FIG. 8 is a diagram showing a two-dimensional table for the user B in Exemplary Embodiment 1;

FIG. 9 is a diagram showing an example of the setting of a score calculation table for a user C in Exemplary Embodiment 1;

Figures 12, 13:
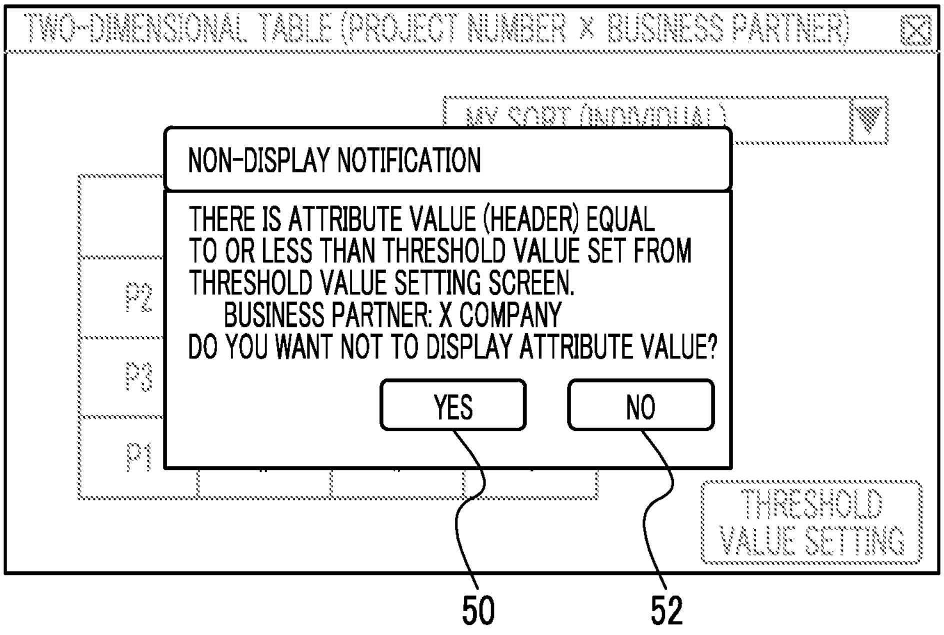
Figure 16:
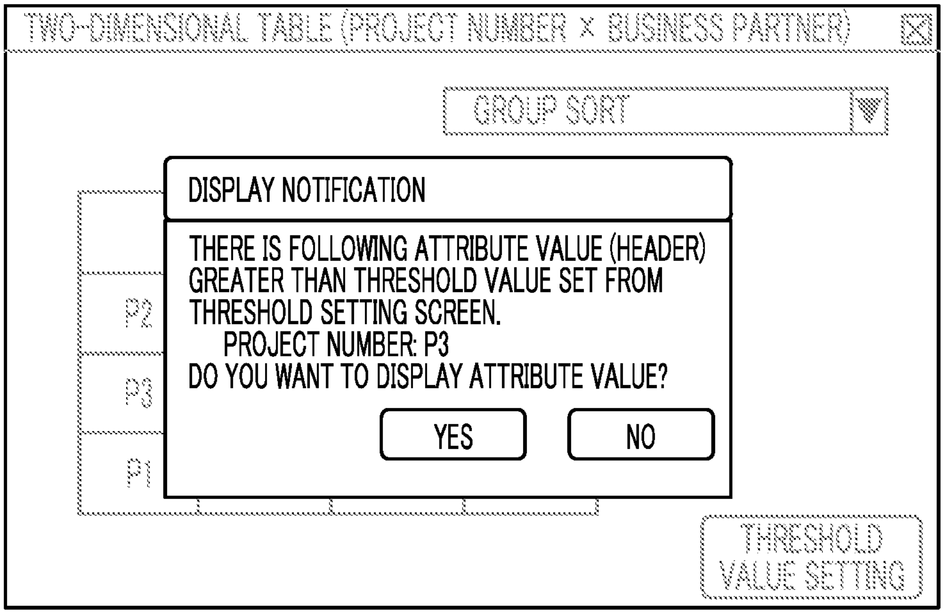
Figure 17:
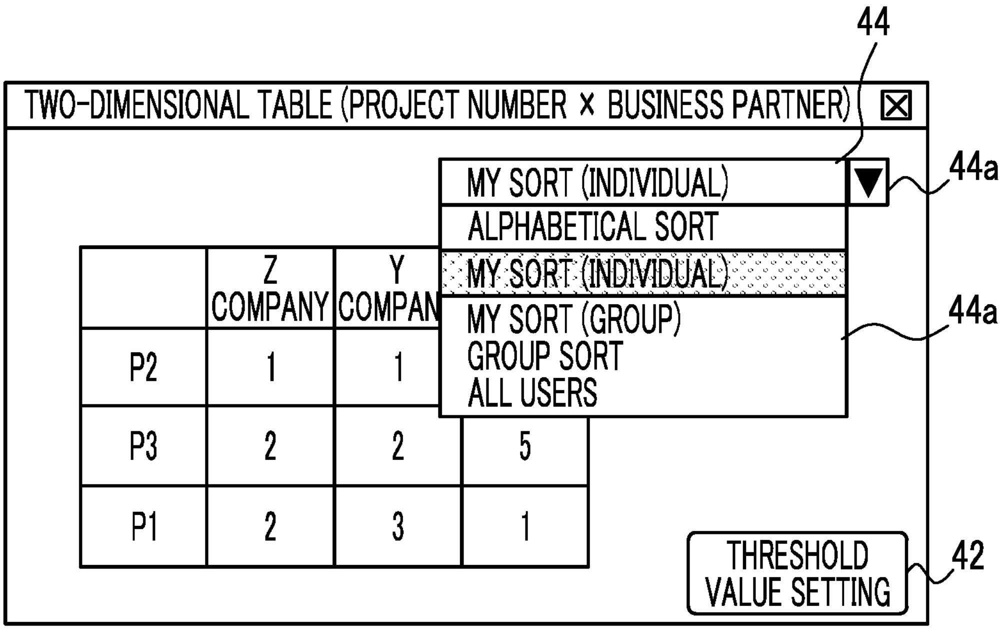

A part (a) in FIG. 12 is a diagram showing a two-dimensional table before a threshold value is reflected, and a part (b) in FIG. 12 is a diagram showing a two-dimensional table after the threshold value is reflected;

FIG. 13 is a diagram showing an example of the display of a non-display notification screen in Exemplary Embodiment 1;

FIG. 14 is a diagram showing an example of the setting of a score calculation table for the user A in which group selection history information has been reflected and which is generated in Exemplary embodiment 2;

FIG. 15 is a diagram showing another example of the setting of the score calculation table for the user A in which the group selection history information has been reflected and which is generated in Exemplary embodiment 2;

FIG. 16 is a diagram showing an example of the display of a display notification screen in Exemplary embodiment 2; and FIG. 17 is a diagram showing an example of the setting of a display mode in Exemplary embodiment 2.

DETAILED DESCRIPTION

Hereinafter, exemplary embodiments of the present invention will be described with reference to the drawings.

Exemplary Embodiment 1

Figure 1:
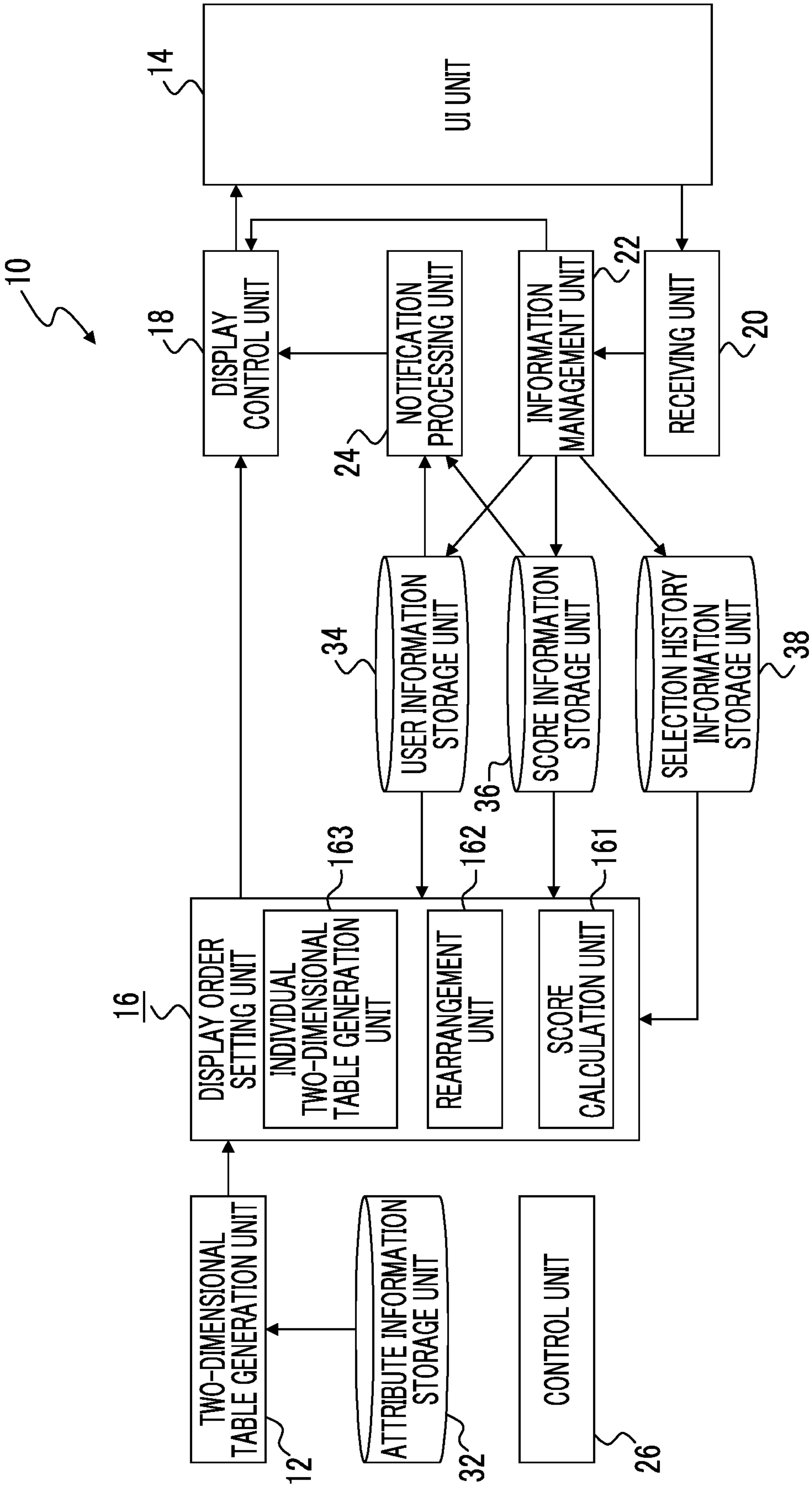
FIG. 1 is a block diagram illustrating an information processing system according to an exemplary embodiment of the present invention.

FIG. 1 is a block diagram illustrating an information processing system according to an exemplary embodiment of the present invention. The information processing system according to the present exemplary embodiment can be implemented by one or more information processing apparatuses. In the following description, a case in which the information processing system is implemented by one information processing apparatus will be described as an example.

An information processing apparatus 10 according to the present exemplary embodiment can be implemented by an existing general-purpose hardware configuration such as a personal computer (PC). That is, the information processing apparatus 10 according to the present exemplary embodiment can be implemented by a configuration including a user interface that includes a CPU, a storage means, such as a ROM, a RAM, and a hard disk drive (HDD), a communication means, such as a network interface, an input means, such as a mouse and a keyboard, and a display means such as display.

As shown in FIG. 1, the information processing apparatus 10 according to the present exemplary embodiment includes a two-dimensional table generation unit 12, a user interface (UI) unit 14, a display order setting unit 16, a display control unit 18, a receiving unit 20, an information management unit 22, a notification processing unit 24, and a control unit 26. In addition, the information processing apparatus 10 includes an attribute information storage unit 32, a user information storage unit 34, a score information storage unit 36, and a selection history information storage unit 38 as data storage means. In addition, components that are not used in the description of the present exemplary embodiment are omitted in the drawings.

Figures 2, 3:
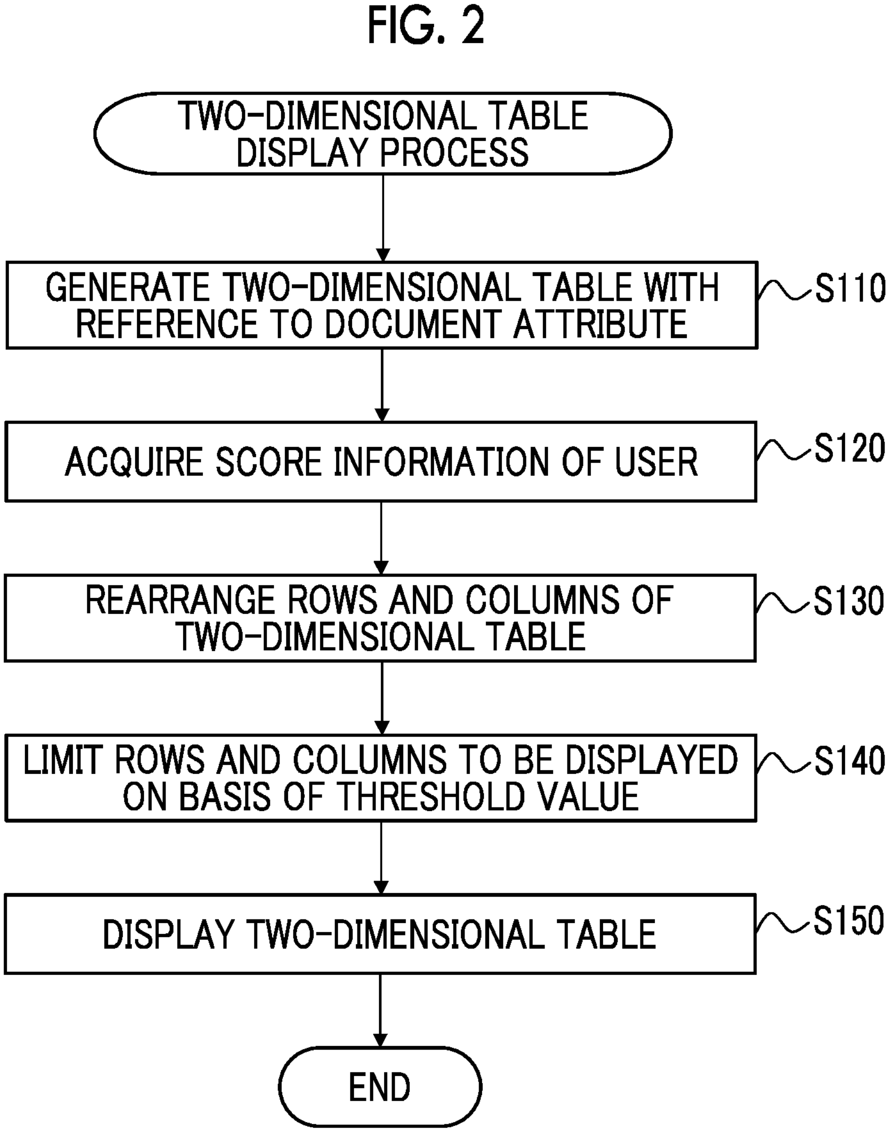
FIG. 2 is a flowchart illustrating a two-dimensional table display process in Exemplary Embodiment 1.
FIG. 3 is a diagram showing a two-dimensional table generated by a two-dimensional table generation unit in the exemplary embodiment.

In the present exemplary embodiment, a data file of an electronic document (hereinafter, also simply referred to as a "document") is treated as a file to be displayed in the two-dimensional table. The "two-dimensional table" is a two-dimensional table in which the original data has been summarized from two viewpoints. In the case of the present exemplary embodiment, the document is treated as data, and attribute information given to the document is used as the viewpoint. Therefore, the two-dimensional table according to the present exemplary embodiment is generated such that, among attributes given to the documents, an attribute value of a first attribute is used as a header of each row and an attribute value of a second attribute given to the document is used as a header of each column. The first attribute and the second attribute are different types of attribute information. In the present exemplary embodiment, as shown in FIG. 3, a "project number" is used as the first attribute, and a "business partner" is used as the second attribute.

Further, in the two-dimensional table, in a cell at a position where a row and a column intersect, statistical information related to a document corresponding to both an attribute value that is the header of the row and an attribute value that is the header of the column is displayed. In the case of the present exemplary embodiment, the total number of documents is used as the statistical information. Since the total number of documents is obtained by aggregating the documents, it is also referred to as an "aggregate value". For example, FIG. 3 shows an example of the two-dimensional table. In the example of the two-dimensional table, as a result of aggregating the documents, whose attribute information is managed by the attribute information storage unit 32, for each project number and each business partner, the number of documents of an "X company" having "P1" as the project number is 1. In addition, in the present exemplary embodiment, the aggregate value of the documents is used as the statistical information. However, the aggregate value is not necessarily used. For example, other numerical data, such as an average value or a ratio, may be used. In addition, the magnitude of the number may be represented by text, such as "large", "medium", and "small", or symbols.

Returning to FIG. 1, the two-dimensional table generation unit 12 aggregates the documents, whose attribute information is managed by the attribute information storage unit 32, for each first attribute and each second attribute to generate the two-dimensional table. The user interface unit 14 is implemented by the input means and the display means in the information processing apparatus 10, displays the two-dimensional table or the like, and allows the user to perform an input operation on the two-dimensional table or the like displayed on the screen.

The display order setting unit 16 sets the arrangement of the headers of the two-dimensional table with reference to a cell selection history of the user stored in the selection history information storage unit 38. In addition, the header is attached to each of the rows and the columns. The "headers of the two-dimensional table" mean the headers of both the rows and the columns. The display order setting unit 16 includes a score calculation unit 161, a rearrangement unit 162, and an individual two-dimensional table generation unit 163. The score calculation unit 161 calculates a score for each cell and each user according to the frequency of selection of each cell in the two-dimensional table by the user. Information related to the score calculated by the score calculation unit 161 is stored as score information in the score information storage unit 36. The rearrangement unit 162 rearranges the headers of the two-dimensional table generated by the two-dimensional table generation unit 12 with reference to the score information as necessary. The individual two-dimensional table generation unit 163 determines whether or not to display the rows and the columns included in the two-dimensional table processed by the rearrangement unit 162 with reference to the user information set in the user information storage unit 34 to generate a two-dimensional table to be finally displayed on the user interface unit 14.

The display control unit 18 controls the display of the user interface unit 14. The receiving unit 20 receives a user operation on the user interface unit 14. The information management unit 22 performs information management, such as the registration of information in the user information storage unit 34, the score information storage unit 36, and the selection history information storage unit 38 or the update of the information, in response to the user operation received by the receiving unit 20. The notification processing unit 24 notifies the user that switching between the display and non-display of the rows or the columns constituting the two-dimensional table can occur. The control unit 26 controls the operations of the components 12 to 24 in the present exemplary embodiment.

The attribute information storage unit 32 stores the attribute information of the documents handled by the information processing system. The attribute information includes an attribute value of each attribute of each document.

The user information storage unit 34 stores the user information related to the user who displays the two-dimensional table. In the user information, a threshold value set by the user is set in association with identification information (for example, a user ID) of the user. The threshold value will be described together with the description of an operation.

The score information calculated by the score calculation unit 161 is stored in the score information storage unit 36. The details of the score information will be described together with the description of the operation.

In some cases, the user selects a cell of the displayed two-dimensional table for the purpose of, for example, displaying the document. The selection of the cell of the two-dimensional table by the user is recorded as selection history information on the selection history information storage unit 38. The user who has selected the cell, the position of the selected cell, and a selection date and time are set in association with each other in the selection history information. The user may be a user ID. In the present exemplary embodiment, the rows and the columns of the two-dimensional table may be rearranged. Therefore, for example, the position of the cell is specified by the attribute values of the corresponding first and second attributes.

In addition, in the present exemplary embodiment, the user is allowed to select a cell for the purpose of use, such as browsing any document of which the aggregate value displayed in the cell is to be counted. Therefore, in the displayed two-dimensional table, displaying the row or the column including the cell at a position where the cell is easy to select is synonymous with that the document is easy to use.

Each of the components 12 to 26 of the information processing apparatus 10 is implemented by a cooperative operation of a computer that constitutes the information processing apparatus 10 and a program that is operated by a CPU provided in the computer. In addition, each of the storage units 32 and 38 is implemented by the HDD provided in the information processing apparatus 10. Alternatively, the RAM or an external storage means may be used via a network.

Further, in the present exemplary embodiment, description will be made assuming that the information processing system is implemented by one computer. However, an information processing system in which the components 12 to 26 are distributed and formed in a plurality of computers connected by a communication network may be used. The "system" in the present exemplary embodiment includes both a system that is configured by a plurality of apparatuses and a system that is configured by a single apparatus.

Further, the program used in the present exemplary embodiment can be provided by a communication means. In addition, the program can be stored in a computer-readable recording medium, such as a CD-ROM or a USB memory, and then provided. The programs provided from the communication means or the recording medium are installed in the computer, and the CPU of the computer sequentially executes the programs to implement various processes.

The present exemplary embodiment is characterized in that the two-dimensional table having the arrangement of the rows and the columns that is easy for each user to use is displayed according to the frequency of selection of the cell by each user. That is, even in a case in which the same two-dimensional table is displayed, the arrangement of the rows and columns in the two-dimensional table can be different depending on the user.

Next, an operation according to the present exemplary embodiment will be described.

Here, it is assumed that, among the attributes given to the documents, the first attribute "project number" is selected and set to the row of the two-dimensional table and the second attribute "business partner" is selected and set to the column of the two-dimensional table by some method. Therefore, the two-dimensional table in which the attribute values "P1", "P2", and "P3" of the project number are used as the headers of each row and the attribute values "X company", "Y company", and "Z company" of the business partner are used as the headers of each column as shown in FIG. 3 will be described as an example.

Meanwhile, in the present exemplary embodiment, the aggregate value of the documents corresponding to both the attribute value which is the header of the row and the attribute value which is the header of the column is set in each cell of the two-dimensional table. The user performs a user operation, such as clicking, to select a corresponding cell of the two-dimensional table displayed on the screen, for example, in order to check the name of the document included in the aggregate value. In a case in which the receiving unit 20 receives the cell selected by the user, the information management unit 22 associates the user who has selected the cell, the position of the cell selected by the user (that is, a set of the attribute values of the row and the column), the date and time of cell selection, and the like to generate selection history information and records the selection history information on the selection history information storage unit 38. The selection history information is stored each time each user of the information processing system selects a cell.

Hereinafter, a two-dimensional table display process according to the present exemplary embodiment will be described with reference to a flowchart shown in FIG. 2.

First, in a case in which the user logs in the information processing apparatus 10 and then performs an operation of displaying a two-dimensional table display screen, the control unit 26 instructs the two-dimensional table generation unit 12 to generate a two-dimensional table. In addition, the user may access the information processing apparatus 10 via a network from an information processing apparatus, such as a user terminal, used by the user. In this case, the user interface unit 14 is provided in the user terminal.

The two-dimensional table generation unit 12 aggregates the documents, whose attribute information is managed by the attribute information storage unit 32, for each project number and each business partner to generate the two-dimensional table in response to this instruction (Step S110). Further, in the following description, the original two-dimensional table which is generated by the two-dimensional table generation unit 12 before the arrangement of the rows and the columns are set is also referred to as a "prototype two-dimensional table".

FIG. 3 is a diagram showing the two-dimensional table generated by the two-dimensional table generation unit 12. The prototype two-dimensional table generated by the two-dimensional table generation unit 12 is usually generated by sorting the headers of the rows indicated by the attribute values of the project number in alphabetical order. Similarly, the prototype two-dimensional table is generated by sorting the headers of the columns indicated by the attribute values of the business partner in alphabetical order.

Meanwhile, the cell selection operation of each user is sequentially recorded on the selection history information storage unit 38 as described above. At the same time, the score calculation unit 161 calculates a score indicating the frequency of selection of the cell by the user who has selected the cell and updates the content of the setting of a score calculation table corresponding to the user stored in the score information storage unit 36. Here, description will be made with a focus on a user A among the users of the information processing system according to the present exemplary embodiment.

FIG. 4 is a diagram showing an example of the setting of the score calculation table for the user A. The score calculation table is a table having the same headers as the two-dimensional table and is stored as the score information in the score information storage unit 36. In the score calculation table shown in FIG. 4, the number of times a cell is selected is set as the frequency of selection. As can be seen from the score calculation table shown in FIG. 4, for the project number P1, the user A selects the cell corresponding to the document of the Y company once and does not select the cells corresponding to the documents of the other X and Z companies. Further, it can be seen that, for the Z company, the user A selects the cells corresponding to the documents of the project numbers P2 and P3 once and does not select the cell corresponding to the document of the project number P1.

In addition, a temporal aggregation range of the number of selections is not limited unless otherwise specified. That is, all of the selection history information recorded on the selection history information storage unit 38 is aggregated. Of course, at least one of the start or end of the temporal aggregation range may be designated.

Then, the rearrangement unit 162 reads out and acquires the score information of the user A from the score information storage unit 36 (Step S120). Then, the rearrangement unit 162 changes the arrangement of the rows and the columns in the prototype two-dimensional table with reference to the acquired score information as necessary to set the arrangement of the rows and the columns in the two-dimensional table for the user A (Step S130).

Therefore, as shown in FIG. 4, the rearrangement unit 162 calculates the sum ("total" in FIG. 4) of the values of the cells in each row and each column of the score calculation table. Then, the rearrangement unit 162 ranks in descending order of the sum.

In the present exemplary embodiment, both the rows and the columns are rearranged in descending order as described above. Here, the rows and the columns are rearranged such that, in a case in which the columns have the same rank, the header of the row having a higher rank ranks high and, in a case in which the rows have the same rank, the header of the column having a higher rank ranks high. The term "high rank" corresponds to the upper side of the screen in the case of the rows and corresponds to the left side of the screen in the case of the columns.

In FIG. 4, either the row or the column may be referred to first. However, here, first focusing on the rows, since the rows have the same rank, rearrangement does not occur at this point of time. Next, focusing on the columns, the columns are ranked in order of the "Z company", the "Y company", and the "X company". Therefore, the rearrangement unit 162 rearranges the columns in this order in the two-dimensional table. Then, focusing on the highest-ranked "Z company", both the scores of "P2" and "P3" are 1, while the score of "P1" is 0 that is lower than the scores of "P2" and "P3". Therefore, the rearrangement unit 162 sets "P1" at the lowest position. Since "P2" and "P3" have the same score, "P2" and "P3" are not rearranged.

The rearrangement unit 162 rearranges the rows and the columns of the two-dimensional table (FIG. 3) generated by the two-dimensional table generation unit 12 as described above and sets the arrangement of the two-dimensional table for the user A. The two-dimensional table for the user A is shown in FIG. 5.

Then, the individual two-dimensional table generation unit 163 limits the rows and columns to be displayed in the two-dimensional table generated by the rearrangement unit 162 with reference to, for example, a threshold value and generates a two-dimensional table to be actually displayed (Step S140). The display control of the rows and the columns in the individual two-dimensional table generation unit 163 will be described below. Here, the two-dimensional table in which the arrangement of the headers has been set by the rearrangement unit 162 is displayed. That is, the display control unit 18 directs the user interface unit 14 to display the two-dimensional table generated by the display order setting unit 16 on the screen (Step S150). FIG. 6 shows an example of the display of the two-dimensional table on the screen.

FIG. 6 is a diagram illustrating an example of the display of a two-dimensional table display screen in the present exemplary embodiment. As shown in FIG. 6, the two-dimensional table (FIG. 5) obtained by rearranging the rows and the columns of the prototype two-dimensional table (FIG. 3) according to the number of times the user A selects the cells is displayed on the two-dimensional table display screen displayed by the user A. In addition, the two-dimensional table display screen is provided with a threshold value setting button 42 for displaying a threshold value setting screen for the user to individually set a threshold value and a mode selection portion 44 for selecting a display mode of the two-dimensional table. Functions provided by these components will be described below.

As described above, in the present exemplary embodiment, in a case in which the user selects any cell, the selection of the cell is recorded. In a case in which the selection of the cell is recorded, the arrangement of the headers in the prototype two-dimensional table is set and displayed. As described above, in the present exemplary embodiment, the two-dimensional table displayed in response to the cell selection operation of the user is updated in real time.

In the setting of the arrangement of the headers in the two-dimensional table, the display order setting unit 16 sets the header of the row, which includes the cell having a higher frequency of selection, at a higher position in the two-dimensional table. Therefore, the row including the cell having a higher frequency of selection is more likely to be displayed on the screen in a case in which the two-dimensional table is displayed. Therefore, the user A can save the trouble of scrolling the two-dimensional table in order to display the row including the cell having a higher frequency of selection. Similarly, the display order setting unit 16 sets the header of the column, which includes the cell having a higher frequency of selection, at a position closer to the left side of the two-dimensional table. Therefore, the column including the cell having a higher frequency of selection is more likely to be displayed on the screen in a case in which the two-dimensional table is displayed. Therefore, the user A can save the trouble of scrolling the two-dimensional table in order to display the column including the cell having a higher frequency of selection.

FIG. 7 is a diagram showing an example of the setting of a score calculation table for a user B different from the user A. The rearrangement of the two-dimensional table will be further described with reference to FIG. 7. Since a processing procedure for performing the rearrangement is the same as that in the case of the user A described with reference to FIG. 4, the processing procedure will be briefly described as appropriate.

As described above, the score calculation table for the user B is generated on the basis of selection history information generated in response to the operation of the user B selecting a cell in the two-dimensional table.

As can be seen from the score calculation table shown in FIG. 7, for the "X company", the user B selects the cells corresponding to the documents of the project numbers "P1", "P2", and "P3" once and does not select the cells corresponding to the documents of the "Y company" and the "Z company" other than the "X company". The rearrangement unit 162 calculates the sum of the values of the cells in each row and each column of the score calculation table with reference to the score calculation table and ranks in descending order of the sum.

Here, first focusing on the rows, the rows have the same rank. Therefore, rearrangement does not occur at this point of time. Next, focusing on the columns, the "X company" ranks highest. Since the "Y company" and the "X company" have the same rank, the columns corresponding to the companies are not rearranged. Here, focusing on the highest-ranked "X company", all of the project numbers have the same score. Therefore, rearrangement does not occur.

The display order setting unit 16 sets the arrangement of the rows and the columns in the two-dimensional table for the user B as described above. The two-dimensional table for the user B is shown in FIG. 8. As shown in FIG. 8, the two-dimensional table for the user B is the same as the prototype two-dimensional table (FIG. 3) as a result of setting the arrangement of the rows and the columns.

FIG. 9 is a diagram showing an example of the setting of a score calculation table for a user C different from the users A and B. The rearrangement of the two-dimensional table will be further described with reference to FIG. 9. Since a processing procedure for performing the rearrangement is the same as that in the case of the user A described with reference to FIG. 4, the processing procedure will be briefly described as appropriate.

As described above, the score calculation table for the user C is generated on the basis of selection history information generated in response to the operation of the user C selecting a cell in the two-dimensional table.

The rearrangement unit 162 calculates the sum of the values of the cells in each row and each column of the score calculation table in the same manner as described above with reference to the score calculation table and ranks in descending order of the sum.

Here, first focusing on the rows, the rows can be ranked in order of "P3", "P1", and "P2". Next, focusing on the columns, the "Y company" and the "Z company" have the highest rank, followed by the "X company". In a case in which the scores of the "Y company" and the "Z company" are referred to, the scores are the same. Therefore, rearrangement does not occur between the "Y company" and the "Z company".

Figures 10, 11:
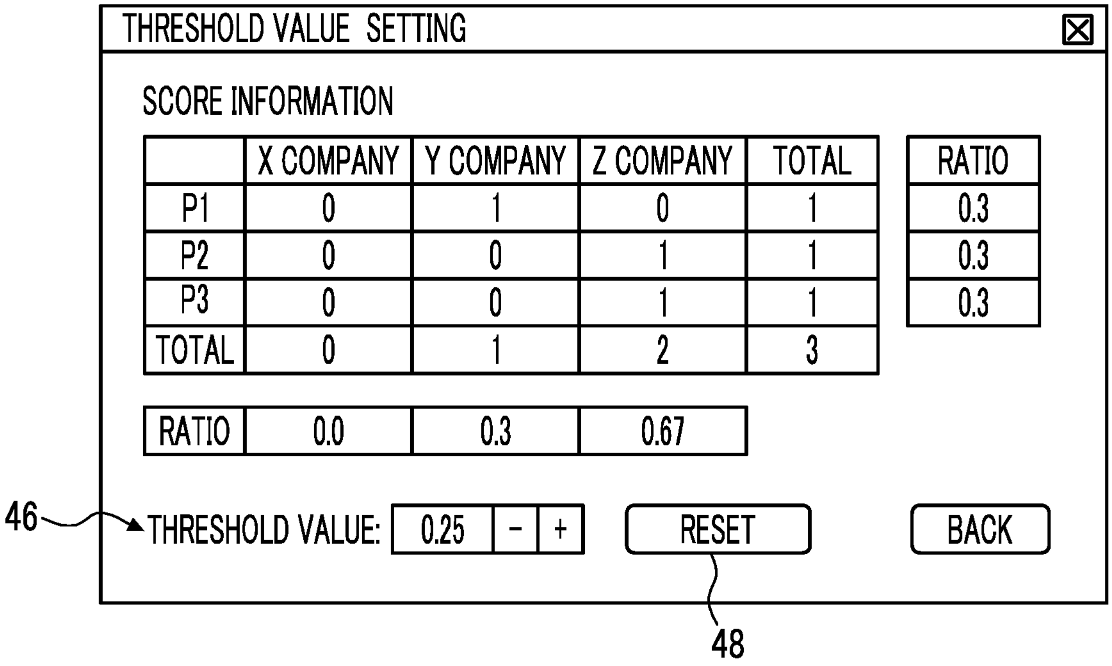
FIG. 10 is a diagram showing a two-dimensional table for the user C in Exemplary Embodiment 1.
FIG. 11 is a diagram showing an example of the display of a threshold value setting screen in Exemplary Embodiment 1.

The display order setting unit 16 rearranges the rows and the columns in the prototype two-dimensional table (FIG. 3) as described above to generate the two-dimensional table for the user C. The two-dimensional table for the user C is shown in FIG. 10.

As described above, according to the present exemplary embodiment, the frequency of selection of cells in the two-dimensional table is aggregated for each user with reference to the selection history information, and the arrangement of the headers in the two-dimensional table used by the user is set according to the frequency of selection aggregated for each user. That is, it can be said that the prototype two-dimensional table generated on the basis of the attribute information of the same document is shared by a plurality of users. According to the present exemplary embodiment, the rows and columns of the prototype two-dimensional table can be rearranged and set such that each user easily uses the rows and the columns, specifically, the rows and columns frequently used are displayed at the top.

Further, in the above description, the frequency of selection of both the rows and the columns of the two-dimensional table is aggregated, and both the rows and the columns are rearranged. However, the frequency of selection of at least one of the rows or the columns may be aggregated, and at least one of the rows or the columns may be rearranged.

Meanwhile, as described above, in the present exemplary embodiment, in the two-dimensional table, the rows and the columns that are frequently used are displayed at the top. The term "top" in a case in which both the rows and the columns are rearranged means the upper left side of the two-dimensional table. On the other hand, in the two-dimensional table, the rows and the columns that are relatively infrequently used are displayed on the lower right side. However, in the above description, since the entire two-dimensional table is displayed, even the rows and columns that are not used by a specific user, that is, information that is not personally needed are displayed. Therefore, in the present exemplary embodiment, a configuration may be used in which the user can individually control the display and non-display of the rows or the columns that are considered to be unnecessary for the user.

FIG. 11 is a diagram showing an example of a threshold value setting screen in the present exemplary embodiment. In the present exemplary embodiment, the display control of the rows or the columns as described above can be performed by setting a threshold value from the threshold value setting screen. The threshold value setting screen is displayed by the selection of the threshold value setting button 42 of the two-dimensional table display screen shown in FIG. 6 by the user.

In FIG. 11, the score calculation table for the user A shown in FIG. 4 is displayed as the score information. Further, the score calculation table includes the total number of selections "3" as the actual value of the frequency of selection of the cell by an individual user (the "user A" in this example), and the "ratio" of the number of selections of each row and each column to the total is further displayed on the threshold value setting screen. In addition, in the present exemplary embodiment, the ratio is rounded off to one decimal place and displayed. However, the present invention is not limited to this.

Furthermore, a setting region 46 for a threshold value is provided in the threshold value setting screen, and the user A sets a threshold value (hereinafter, also referred to as a "threshold value for display control") that the user A wants in the setting region 46. In the example of the display of the screen shown in FIG. 11, the user A sets "0.25" as the threshold value for display control. In the present exemplary embodiment, in a case in which the user sets the threshold value for display control, the display of the rows and columns of the two-dimensional table for the user is controlled as follows according to the magnitude relationship between the total number of times the user selects the cells and the threshold value for display control.

FIG. 12 is a diagram showing the two-dimensional table for the user A and the content of the display. The part (a) in FIG. 12 shows a two-dimensional table after the rearrangement unit 162 rearranges the rows and the columns. Since the rearrangement unit 162 rearranges the prototype two-dimensional table as described above, the part (a) in FIG. 12 is the same as FIG. 5. Then, the individual two-dimensional table generation unit 163 searches for the rows and the columns having a ratio equal to or less than the threshold value for display control with reference to the threshold value for display control set by the user A. As can be seen from the example of the display of the screen shown in FIG. 11, only the column of the "X company" has a value "0.0" that is equal to or less than the threshold value. Therefore, the individual two-dimensional table generation unit 163 excludes the rows and the columns that are equal to or less than the threshold value for display control from the objects to be displayed in the two-dimensional table rearranged by the rearrangement unit 162. The part (b) in FIG. 12 shows a two-dimensional table after the individual two-dimensional table generation unit 163 sets the display and non-display of each row and each column according to the threshold value for display control. As shown in the part (b) in FIG. 12, the column of the "X company" is excluded from the objects to be displayed. Therefore, the display control unit 18 displays the two-dimensional table shown in the part (b) in FIG. 12. Of course, in a case in which there is no row or column having the ratio equal to or less than the threshold value for display control, the display control unit 18 displays the two-dimensional table shown in the part (a) in FIG. 12. Further, in the present exemplary embodiment, display control is performed such that the row or the column having the ratio equal to or less than the threshold value for display control is not displayed. However, the non-display of the row or the column is not necessarily performed. For example, the display color of the row or the column may be changed such that the row or the column is distinguishable from the row or the column having the ratio greater than the threshold value for display control.

Meanwhile, according to the present exemplary embodiment, for example, in a case in which the user relatively selects a cell corresponding to the document related to the case that the user is involved in, the row corresponding to the case is likely to be displayed at the top of the two-dimensional table. The display control of the row and the column based on the above-described threshold value is performed by the comparison between the ratio and the threshold value for display control. Therefore, even in a situation in which a project that the user is involved in is ended and the user no longer has the opportunity to refer to the document related to the project, the project may be displayed at the top for a while since the ratio of the project is relatively high. As described above, in the present exemplary embodiment, a "reset" button 48 is provided as shown in FIG. 11 in consideration of a case in which the user wants to effectively remove unnecessary information from the two-dimensional table.

That is, in a case in which the receiving unit 20 receives the selection of the "reset" button 48 by the user A, the information management unit 22 initializes the total number of selections "3" to be referred to in the calculation of the ratio to 0. Specifically, for example, flag information (hereinafter, a "reset flag") related to the presence or absence of reset may be associated with the selection history information. The information management unit 22 sets 0 (that is, clear) as an initial value to the reset flag when generating the selection history information. In a case in which the "reset" button 48 is selected as described above, the information management unit 22 sets 1 (that is, set) to the reset flag of the selection history information of user A registered in the selection history information storage unit 38 before the time of the selection. In this way, the total number of selections in a case in which the score calculation table is generated is initialized to 0.

Here, in a state in which the threshold value for display control is set, all of the rows and the columns are excluded from the objects to be displayed. Therefore, it is necessary to take measures for that. For example, the threshold value for display control may be enabled only in a case in which the total number of selections is equal to or greater than a predetermined threshold, or the threshold value for display control may be automatically initialized to 0 with the initialization of the total number of selections.

Further, in the above description, the display control of the two-dimensional table displayed by the user interface unit 14 on the two-dimensional table display screen has been described. However, in the score calculation table displayed on the threshold value setting screen, the row or the column having the ratio equal to or less than the threshold value for display control may be displayed in a different form from the row or the column having the ratio that is not equal to or less than the threshold value for display control. For example, the row or the column having the ratio equal to or less than the threshold value for display control may be displayed in grayscale, the color of the row or the column may be changed, or the row or the column may not be displayed.

Meanwhile, as described above, the setting of the threshold value for display control makes it possible to perform control such that the row and the column corresponding to the document that is rarely used by the user are not displayed. However, in the above process, since the display control not to display the row and the column is automatically performed, the user may not like to switch between the display and the non-display without noticing. Therefore, at the time of the switching between the display and the non-display, the user may be asked whether or not to perform the switching.

FIG. 13 is a diagram showing an example of a non-display notification screen according to the present exemplary embodiment. In a case in which the user performs, for example, an operation of clicking a cell of the two-dimensional table, the ratio of the row and the column in the two-dimensional table is changed. Therefore, in some cases, the ratio of any row or column is equal to or less than the threshold value for display control. In this case, the notification processing unit 24 displays the non-display notification screen to be superimposed on the two-dimensional table referred to by the user as shown in FIG. 13 to ask the user whether not to display the row or the column. The user refers to a message displayed on the non-display notification screen, selects a "Yes" button 50 in a case in which the user does not want to display the corresponding row or column ("business partner: X company" in FIG. 13) and selects a "No" button 52 in a case in which the user wants to maintain the display state. After the selection of the button, the display returns to the two-dimensional table display screen. In a case in which the user selects the "Yes" button 50 at this time, the two-dimensional table in which the corresponding row or column is not displayed is displayed, for example, as shown in the part (b) in FIG. 12. On the other hand, in a case in which the user selects the "No" button 52, the two-dimensional table in which the corresponding row or column is displayed is displayed, for example, as shown in the part (a) in FIG. 12.

Exemplary Embodiment 2

In Exemplary Embodiment 1, according to the frequency of selection of the cells by a user, the two-dimensional table for the user is generated and displayed. That is, the headers of the two-dimensional table are rearranged according to the frequency of selection of the cells in the two-dimensional table for only one individual, and the two-dimensional table for the individual is displayed. The present exemplary embodiment is characterized in that, even in a case in which a two-dimensional table for one individual is displayed, the headers of the two-dimensional table are rearranged in a state in which the frequency of selection of the cells by another user is reflected to generate the two-dimensional table for the individual and the two-dimensional table for the individual is displayed.

An information processing system according to the present exemplary embodiment may have the same configuration as the information processing system according to Exemplary Embodiment 1. However, in the user information stored in the user information storage unit 34, group information for specifying a group to which the user belongs is set in association with the user ID.

Next, a two-dimensional table display process according to the present exemplary embodiment will be described. Here, the user A will be described as a representative example of the individual.

First, the score calculation unit 161 knows that the group to which the user A belongs is composed of three users including a user B and a user C with reference to the user information.

FIG. 14 shows a score calculation table for the user A and score calculation tables for the user B and the user C who are the other users belonging to the same group as the user A. In addition, the score calculation tables for the users A, B, and C belonging to the same group are the same as the score calculation tables shown in FIGS. 4, 7, and 9.

First, as in Exemplary Embodiment 1, the score calculation unit 161 generates the score calculation table for each group user for each user as shown in parts (a), (b), and (c) in FIG. 14 with reference to the selection history information. Then, the score calculation unit 161 adds up the scores set in each of the three score calculation tables for each corresponding cell to generate a total table as shown in a part (d) in FIG. 14.

Then, the score calculation unit 161 searches for a cell having the maximum total value in the total table. In a numerical example shown in the part (d) in FIG. 14, the maximum value is 2, and a cell corresponding to the project number "P1" and the business partner "Y company", a cell corresponding to the project number "P3" and the business partner "X company", and a cell corresponding to the project number "P3" and the business partner "Z company" have the maximum value. In parts (d) and (e) in FIG. 14, the corresponding cells are surrounded by thick lines.

In a case in which the cells having the maximum value are specified, the score calculation unit 161 updates the score calculation table for the user A shown in the part (a) in FIG. 14 with reference to the positions of the cells as follows.

That is, in the present exemplary embodiment, the frequency of selection is calculated according to a rule that multiplies the score corresponding to the position of the cell having the maximum value by 1.5. According to this update rule, the score (hereinafter, also referred to as a "cell value") "1" of the cell corresponding to the project number "P1" and the business partner "Y company" is multiplied by 1.5 and is updated to "1.5". The cell value "0" corresponding to the project number "P3" and the business partner "X company" remains "0" even in a case in which the cell value "0" is multiplied by 1.5. Then, the cell value "1" corresponding to the project number "P3" and the business partner "Z company" is multiplied by 1.5 and is updated to "1.5". A score calculation table for the user A obtained by updating the cell values as described above is shown in the part (e) in FIG. 14.

In the score calculation tables shown in parts (a) and (e) in FIG. 14, the ranks of each row and each column are also shown for reference. However, the comparison between the ranks shown in the parts (a) and (e) in FIG. 14 shows that there is a row whose rank has been changed (the row of the project number "P2"). In Exemplary Embodiment 1, the number of times the cell is selected is used as the frequency of selection of the cell. However, in the present exemplary embodiment, the number of times the user selects the cell is calculated by weighting. For example, the number of times the user selects the cell is multiplied by 1.5 according to a predetermined update rule. The score calculation unit 161 stores the score calculation table for the user A, which has been updated as described above, as the score information in the score information storage unit 36. That is, in Exemplary Embodiment 1, the score calculation table shown in the part (a) in FIG. 14 is used. However, in the present exemplary embodiment, the score calculation table shown in the part (e) in FIG. 14 is used.

A process (Steps S130 to 150) after the score calculation unit 161 updates the score calculation table for the user A shown in the part (a) in FIG. 14 according to the predetermined update rule may be the same as the process in Exemplary embodiment 1. Therefore, the description thereof will not be repeated.

The description has been made with a focus on the user A. However, it is possible to generate user-specific score calculation tables for the other users B and C on the basis of the above-described update rule in the same manner as described above.

In the present exemplary embodiment, the score which emphasizes the number of times a user selects the cell and in which the frequency of selection of the cell by other users belonging to the same group has been reflected is calculated. The arrangement of the headers in the two-dimensional table is slightly different from the arrangement in the case based only on the cell selection history of a user as in Exemplary Embodiment 1, which makes it possible to intuitively know the row and the column including the cell selected by other users in the same group.

FIG. 15 is a diagram showing a method for generating a score calculation table on the basis of an update rule different from the update rule in the case described with reference to FIG. 14. Here, the user A will be described as a representative example.

FIG. 15 shows a process that multiplies each score in the score calculation table for the user A shown in a part (a) in FIG. 15 by a predetermined weight in a case in which the scores of the group users are added up, unlike the update rule shown in FIG. 14. In FIG. 15, the scores of the user A are multiplied by 2, and the scores of the users other than the user A are multiplied by 1, that is, are treated as they are. According to this process, it can be said that the total table used in FIG. 14 becomes the score calculation table as it is.

For example, according to this update rule, the cell value “1” of the user A which corresponds to the project number “P1” and the business partner “Y company” is multiplied by 2 and is updated to “2”. On the other hand, the cell value “0” of the user B and the cell value “1” of the user C are multiplied by 1 and are “0” and “1”, respectively. Then, the calculated values for three users are added up. As a result, the cell value corresponding to the project number “P1” and the business partner “Y company” in the score calculation table for the user A is 3 (=2+0+1). A part (d) in FIG. 15 shows the score calculation table for the user A obtained by updating the cell values as described above.

The ranks of the rows and the columns shown in the part (d) in FIG. 15 are different from the ranks shown in the part (a) in FIG. 15 and the part (e) in FIG. 14. Both the score calculation table update methods shown in FIGS. 14 and 15 are common in that the frequency of selection of the cell by a first user (in the above-described example, the “user A”) is given a larger weight than the frequency of selection of the cell by other users (in the above-described example, the user B and the user C) to calculate a cell value for the first user. However, in FIG. 14, the cell values for all of the group users are treated equally and added up, and the cell having the maximum value is weighted to update the score calculation table for the first user. In contrast, in FIG. 15, the cell values for the first user are weighted to update the score calculation table for the first user. In this respect, the influence of the number of times that all of the group users select the cells tends to be reflected in the score calculation table update method shown in FIG. 14. That is, the score of the cell that is frequently selected by a user and other group users is high. For example, since the cell corresponding to the project number “P3” and the business partner “Z company” is frequently selected by both a user and other group users, the cell is weighted. However, since the cell corresponding to the project number “P2” and the business partner “Z company” is selected by the user, but is rarely selected by other group users, the cell is not weighted. Further, in FIG. 15, only the cell that is frequently selected by the user is weighted.

Of course, the ranks of the rows or the columns determined by the cell value calculation methods shown in FIGS. 14 and 15 tend to largely depend on the weight given to the first user, that is, the set value of a coefficient used in the calculation expression.

Meanwhile, in Exemplary Embodiment 1, as described with reference to FIG. 13, the non-display of the row or the column is not automatically performed depending on the magnitude relationship between the frequency of selection of the cell and the threshold value for display control, but the user is notified of the non-display of the row or the column before switching to the non-display. This is also applied to Exemplary embodiment 2. However, a notification time, that is, the time when the ratio of the frequency of selection of the cell to the total is equal to or less than the threshold value for display control depends on the threshold value for display control individually set by each user.

Further, in a case in which the selection history information of all of the group users is referred to as in the present exemplary embodiment, the total number of selections of the cells is for all of the group users. Therefore, the display and non-display of the row or the column are affected by the number of times other users select the cells. Therefore, in the displayed two-dimensional table, in some cases, the cell included in the row or the column that is not displayed is selected by other group users, and the ratio of the frequency of selection of the cell to the total is greater than the threshold value for display control. Therefore, in the present exemplary embodiment, before switching from the non-display to the display is automatically performed, the user may be asked whether or not to perform the switching.

FIG. 16 is a diagram illustrating an example of a display notification screen in the present exemplary embodiment. Since a user operation on the display notification screen is basically the same as the user operation on the non-display notification screen, the description thereof will not be repeated. In a case in which some users want to maintain the row or the column that is not displayed in the non-display state, it is possible to maintain the non-display state.

Exemplary Embodiment 3

In a case in which the two-dimensional table is displayed, the headers that have been arranged in alphabetical order are rearranged according to the frequency of selection by the user in Exemplary Embodiments 1 and 2. A configuration in which the user can appropriately select and display these display formats may be used.

FIG. 17 is a diagram showing a state in which a button 44*a* of a mode selection portion 44 is operated by the user and a pull-down menu 44*b* is expanded and displayed on the two-dimensional table display screen shown in FIG. 6. In the present exemplary embodiment, display modes displayed in the pull-down menu 44*b* are prepared. “Alphabetical sort” is a mode in which headers are arranged and displayed in alphabetical order as in the past. In the subsequent display modes, the rearrangement of the headers that is characteristic of the present exemplary embodiment is performed. Among these display modes, “My sort (individual)” is a display mode limited to the individual as in Exemplary Embodiment 1. “My sort (group)” is a display mode in which the frequency of selection of the cells by the group users is referred to as in Exemplary Embodiment 2. In addition, the display modes may be separately provided to correspond to the score calculation methods shown in FIGS. 14 and 15 and a list of the display modes may be displayed in the pull-down menu 44*b*. In “My sort (group)”, the individual scores are weighted in a case in which the score calculation table is obtained. However, in “Group sort”, the individual scores are not weighted. Therefore, the two-dimensional table displayed by the selection of “Group sort” by the user belonging to the same group is common to the group users and has the same arrangement of the headers. However, since the threshold value is set for each user, the display range of the rows or the columns may be different. “All users” is a mode in which the two-dimensional table is generated with reference to the selection history information of all of the users of the information processing system, that is, all of the users whose user information has been registered in the user information storage unit 34, excluding the frame of the group. The same two-dimensional table is displayed regardless of which user selects “All users”. However, since the threshold value is set for each user, the display range of the rows or the columns may be different.

As described above, the user can input an instruction to display the two-dimensional table while switching the display mode. That is, the above-described exemplary embodiments can be combined and implemented as appropriate.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

SUPPLEMENTARY NOTE (((1)))

An information processing system comprising:

a processor configured to:

set an arrangement of headers in a two-dimensional table, in which an attribute value of a first attribute given to a file is a header of each row and an attribute value of a second attribute given to the file is a header of each column, with reference to history information in which a user and a cell selected by the user are recorded in association with each other in a case in which the user selects the cell of the two-dimensional table; and display the two-dimensional table in which the arrangement of the headers has been set.

(((2)))

The information processing system according to (((1))), wherein the processor is configured to:

aggregate a frequency of selection of at least one of the row or the column in the two-dimensional table for each user from the history information; and set the arrangement of the headers in the two-dimensional table used by the user according to the frequency of selection aggregated for each user.

(((3)))

The information processing system according to (((2))), wherein the processor is configured to:

in a case in which the frequency of selection of the row in the two-dimensional table is aggregated, set the header of a row having a higher frequency of selection at a higher position.

(((4)))

The information processing system according to (((2))), wherein the processor is configured to:

in a case in which the frequency of selection of the column in the two-dimensional table is aggregated, set the header of a column having a higher frequency of selection at a position closer to a left side.

(((5)))

The information processing system according to (((2))), wherein the processor is configured to:

in a case in which the user sets a threshold value for display control, control display of the row or the column of the two-dimensional table for the user according to a magnitude relationship between the threshold value and an actual value indicating the frequency of selection of the row or the column in the two-dimensional table by the user.

(((6)))

The information processing system according to (((5))), wherein the processor is configured not to:

display a row or a column having the actual value equal to or less than the threshold value.

(((7)))

The information processing system according to (((5))), wherein the processor is configured to:

in a case in which switching is performed between display and non-display of the row or the column of the two-dimensional table in which the magnitude relationship between the actual value and the threshold value changes with the selection of the cell by the user, ask the user whether or not to perform the switching.

(((8)))

The information processing system according to (((1))), wherein the processor is configured to:

in a case in which the two-dimensional table is shared by a plurality of users, calculate a score corresponding to a frequency of selection of each cell in the two-dimensional table for each cell and each user with reference to the history information; and set the arrangement of the headers in the two-dimensional table for each user on the basis of the calculated score.

(((9)))

The information processing system according to (((8))), wherein the processor is configured to:

in a case in which the two-dimensional table for a first user among the plurality of users is set, give a larger weight to the frequency of selection of the cell by the first user than the frequency of selection of the cell by other users to calculate the score for the first user; and set the arrangement of the headers in the two-dimensional table for the first user on the basis of the calculated score for the first user.

(((10)))

The information processing system according to (((8))), wherein the processor is configured to:

in a case in which each of the plurality of users sets a threshold value for display control and the two-dimensional table for a first user among the plurality of users is displayed, control display of the two-dimensional table for the first user according to a magnitude relationship between an actual value indicating the frequency of selection of at least one of the row or the column in the two-dimensional table by the plurality of users and the threshold value set by the first user.

(((11)))

The information processing system according to (((10))), wherein the processor is configured to:

in a case in which switching is performed between display and non-display of the row or the column in the two-dimensional table for the first user, ask the first user whether or not to perform the switching.

(((12)))

A program causing a computer to implement:

a function of setting an arrangement of headers in a two-dimensional table, in which an attribute value of a first attribute given to a file is a header of each row and an attribute value of a second attribute given to the file is a header of each column, with reference to history information in which a user and a cell selected by the user are recorded in association with each other in a case in which the user selects the cell of the two-dimensional table; and a function of displaying the two-dimensional table in which the arrangement of the headers has been set.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

a processor configured to:

obtain or generate a first two-dimensional table, in which an attribute value of a header of each row and an attribute value of a header of each column vary with reference to history information in which a user and a cell selected by the user are recorded in association with each other;

re-arrange the first two-dimensional table with reference to the history information to change from the first two-dimensional table to a second two-dimensional table, wherein a first row is display at a higher position than a second row in the first two-dimensional table, the second row from the first two-dimensional table is adjusted to be displayed at a higher position in the second two-dimensional table than the first row from the first two-dimensional table in the second two-dimensional table, and a cell of the second row has a higher frequency of selection than a cell of the first row according to the history information, and display, on a display screen, the second two-dimensional table in response to re-arranging rows or columns of the first two-dimensional table.

2. The information processing system according to claim 1, wherein the processor is configured to:

aggregate a frequency of selection of at least one of the row or the column in the first two-dimensional table for the user from the history information; and re-arrange headers in the first two-dimensional table according to the frequency of selection for the user so as to generate the second two-dimensional table.

3. The information processing system according to claim 2, wherein a first column is display at a position further left than a second column in the first two-dimensional table, and the second column from the first two-dimensional table is adjusted to be displayed at a position further left in the second two-dimensional table than the first column from the first two-dimensional table in the second two-dimensional table.

4. The information processing system according to claim 3, wherein the second column from the first two-dimensional table has a higher frequency of selection than the first column from the first two-dimensional table so that the second column from the first two-dimensional table is adjusted to be displayed at the position further left in the second two-dimensional table than the first column from the first two-dimensional table in the second two-dimensional table.

5. The information processing system according to claim 2, wherein the processor is configured to:

in a case in which the user sets a threshold value for display control, control display of the row or the column of the second two-dimensional table for the user according to a magnitude relationship between the threshold value and an actual value indicating the frequency of selection of the row or the column in the first two-dimensional table by the user.

6. The information processing system according to claim 5, wherein the processor is configured not to:

display a row or a column having the actual value equal to or less than the threshold value in the second two-dimensional table.

7. The information processing system according to claim 5, wherein the processor is configured to:

in a case in which switching is capable of being performed between a display and a non-display of the row or the column of the first or second two-dimensional table in which the magnitude relationship between the actual value and the threshold value changes with a selection of a cell by the user, ask the user whether or not to perform the switching.

8. The information processing system according to claim 1, wherein the processor is configured to:

in a case in which the two-dimensional table is shared by a plurality of users, calculate a score corresponding to a frequency of selection of each cell in the first two-dimensional table for each cell and each user with reference to the history information; and set an arrangement of the headers in the first two-dimensional table for each user on the basis of the calculated score.

9. The information processing system according to claim 8, wherein the processor is configured to:

in a case in which the first two-dimensional table for a first user among the plurality of users is set, give a larger weight to the frequency of selection of the cell by the first user than the frequency of selection of the cell by other users to calculate the score for the first user; and set the arrangement of the headers in the first two-dimensional table for the first user on the basis of the calculated score for the first user.

10. The information processing system according to claim 8, wherein the processor is configured to:

in a case in which each of the plurality of users sets a threshold value for display control and the first two-dimensional table for a first user among the plurality of users is displayed, control display of the second two-dimensional table for the first user according to a magnitude relationship between an actual value indicating the frequency of selection of at least one of the row or the column in the two-dimensional table by the plurality of users and the threshold value set by the first user.

11. The information processing system according to claim 10, wherein the processor is configured to:

in a case in which switching is capable of being performed between a display and a non-display of the row or the column in the first or second two-dimensional table for the first user, ask the first user whether or not to perform the switching.

12. A non-transitory computer readable medium storing a program causing a processor of an information processing system to implement:

obtaining or generating a first two-dimensional table, in which an attribute value of a header of each row and an attribute value of a header of each column vary with reference to history information in which a user and a cell selected by the user are recorded in association with each other;

re-arranging the first two-dimensional table with reference to the history information to change from the first two-dimensional table to a second two-dimensional table, wherein a first row is display at a higher position than a second row in the first two-dimensional table, the second row from the first two-dimensional table is adjusted to be displayed at a higher position in the second two-dimensional table than the first row from the first two-dimensional table in the second two-dimensional table, and a cell of the second row has a higher frequency of selection than a cell of the first row according to the history information, and displaying, on a display screen, the second two-dimensional table in response to re-arranging rows or columns of the first two-dimensional table.

13. An information processing method executed by a processor of an information processing system, the method comprising:

obtaining or generating a first two-dimensional table, in which an attribute value of a header of each row and an attribute value of a header of each column vary with reference to history information in which a user and a cell selected by the user are recorded in association with each other;

re-arranging the first two-dimensional table with reference to the history information to change from the first two-dimensional table to a second two-dimensional table, wherein a first row is display at a higher position than a second row in the first two-dimensional table, the second row from the first two-dimensional table is adjusted to be displayed at a higher position in the second two-dimensional table than the first row from the first two-dimensional table in the second two-dimensional table, and a cell of the second row has a higher frequency of selection than a cell of the first row according to the history information, and displaying, on a display screen, the second two-dimensional table in response to re-arranging rows or columns of the first two-dimensional table.

* * * * *